United States Patent [19]
Bozman et al.

[11] Patent Number: 5,088,026
[45] Date of Patent: Feb. 11, 1992

[54] METHOD FOR MANAGING A DATA CACHE USING VIRTUAL EXTERNAL STORAGE ADDRESSES AS ARGUMENTS

[75] Inventors: Gerald P. Bozman, Oakland, N.J.; George Eisenberger, White Plains; Alexander S. Lett, Mahopac, both of N.Y.; James J. Myers, San Francisco, Calif.; William H. Tetzlaff, Mount Kisco; Jay H. Unger, Mohegan Lake, both of N.Y.

[73] Assignee: International Business Machines Corporation, Armonk, N.Y.

[21] Appl. No.: 477,704

[22] Filed: Feb. 9, 1990

[51] Int. Cl.[5] .................................................. G06F 1/00
[52] U.S. Cl. ............................. 395/425; 364/DIG. 1
[58] Field of Search ............................. 364/200, 900

[56] References Cited

U.S. PATENT DOCUMENTS

| | | | |
|---|---|---|---|
| 3,825,904 | 7/1974 | Burk et al. | 364/200 |
| 3,902,164 | 7/1975 | Kelley et al. | 364/200 |
| 4,376,297 | 3/1983 | Anderson et al. | 364/200 |
| 4,603,380 | 7/1986 | Easton et al. | 364/200 |
| 4,680,700 | 6/1987 | Hester et al. | 364/200 |
| 4,755,928 | 7/1988 | Johnson et al. | 364/200 |

Primary Examiner—Douglas W. Olms
Assistant Examiner—T. Samuel
Attorney, Agent, or Firm—R. Bruce Brodie

[57] ABSTRACT

A method to manage the access of data or pages mapped into a very large virtual external address space through a cache without disturbing the logical view of the data and without having to assign physical or real backing store to said logical view. A data cache is used in which pages are indexed according to a logical address intermediate to their virtual address and their physical location in external storage. Pages common to two or more files are updated in place in the cache, while pages bound to only one file are shadow copied.

6 Claims, 3 Drawing Sheets

SOFTWARE CACHE & PLACEMENT
ACCORDING TO THE INVENTION

AVOIDANCE OF SYNONYM USING VESA
ORDERED PAGES

UPDATE IN PLACE & SHADOW COPYING PER INVENTION

LOGICAL VIRTUAL ADDRESS

METHOD FOR MANAGING A DATA CACHE USING VIRTUAL EXTERNAL STORAGE ADDRESSES AS ARGUMENTS

FIELD OF THE INVENTION

This invention relates to computer-managed storage and, more particularly, to methods for managing the data cache portion of CPU external storage.

DESCRIPTION OF RELATED ART

The following paragraphs briefly describe prior art computer context within which the invention resides. This includes aspects of the CPU operating system and selected resource managers in relation to staged internal and external storage, data cache and invalidation, demand page virtual store, and virtually addressable cache.

CPU AND STAGED STORAGE

Modern data processing machines comprise an instruction processor coupled to a hierarchically organized and least recently used (LRU) managed staged storage system containing software and data. The fastest, most rapidly accessed storage is positioned closest to the instruction processor. Also, it is placed at the top of the hierarchy. Progressively slower forms of storage, which have the bulk of the information written thereon, occupy the lower positions within the hierarchy.

Because storage costs increase dramatically with speed, many computer systems divide the physical storage subsystem into a number of performance levels. Some of these levels, such as DASD and tape, have been treated as peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is randomly accessed on a block or page addressable (4096 bytes/page) basis. It is managed as an LRU real memory backed paging store. Lastly, "external storage" refers to that bulk portion of storage that is not randomly addressable and must be directly accessed, as on DASD.

The internal store is deemed "synchronous" when a processor referencing said internal store will idle until a return is received; whereas, if the data being sought resides in external store (beyond a point called the "I/O boundary"), a referencing processor will search for another task to perform instead of waiting. This task or process switching is disruptive in that a retrieval path must be established to the new data, and the processing state of the prior task must be saved. When the retrieval from external storage has been completed, it is again necessary to switch the CPU back to the former process or task.

CACHE AND CACHE INVALIDATE

A "cache" is taken to be an indexable LRU-ordered collection of pages in a buffer. It is usually positioned in a path to data or instructions so as to minimize access time. Relatedly, the term "cache invalidate" refers to either removing from the cache or providing indication that a named page is invalid. This devolves from the fact that the base page was changed on some other data path so that the version in a given cache is no longer accurate. Parenthetically, invalidation can be implemented by leaving it in the cache or marking the cache directory that an inaccurate page is invalid.

CPU, OPERATING SYSTEM, AND RESOURCE MANAGERS

Each processor or CPU system typically includes an operating system, a local cache operatively formed from processor internal memory, DASD-oriented external store, and lock and cache resource managers. Processes executing on a CPU generate read and write operations by way of the operating system. In turn, the read and write operations utilize the cache and lock resource managers to establish directory lockable access paths to pages either resident in cache or as refreshed into cache from the external store.

DEMAND PAGING VIRTUAL STORAGE

"Virtual storage" is the addressing of a storage space much larger than that available in the internal storage of a CPU. It relies on locality of referencing in both space and time. That is, processes tend to reference storage in nonuniform, highly localized patterns. This makes it possible for a small amount of real storage to back a much larger amount of virtual storage. If the referenced data is not available in internal storage, then it is swapped in from external storage.

In a virtual demand paging system, each process actively references some subset of its virtual pages. The capacity of the system to manage pages is measured in terms of an upper bound on the number of slots or "page frames". That is, the number of page frames is related to the amount of internal store set aside to support the page frames. If the sum of the subsets of pages referenced by processes exceeds the number of page frames, then faulting will occur. "Faulting" is a synonym for the requirement to access external storage since the referenced page was not resident in the LRU-managed internal store. A system in this state is said to be "paging".

THE SYNONYM PROBLEM

Ambiguity arises where either two different names are used to designate the same physical page, or two different physical pages are assigned the same name. These "synonyms" are wasteful of cache space and create a cache invalidate problem since the cache manager usually has no way of associating the many possible names for the same data.

PRIOR ART VIRTUALLY ADDRESSED CACHE

Woffinden et al., U.S. Pat. No. 4,612,612, "Virtually Addressed Cache", issued Sept. 16, 1986, sought to treat the cache as a virtual addressable entity. That is, Woffinden took the original virtual address and performed caching based on that address. While Woffinden does not describe virtual to real address translation performed on the fly using translation look-aside buffers (TLB's), such accelerates cache look up and is known to the prior art.

The drawback of Woffinden relates to the inherent difficulty in sharing pages. However, since the pages are cached by their virtual addresses, each page is treated independently. This occurs even though both virtual page addresses may reference the same ultimate address in real storage. Also, there is a finite expectancy that virtual addresses in different address spaces are mappable (hashable) to the same real address.

FILES AND VIEWS

A "data file" is a linear space of pages mapped to virtual frames. The real frames are stored on the DASD external store. The "synonym problem" frequently arises where there exist multiple versions of (or more properly, "views of") a file. In this regard, a file version or view is a file having at least one page in common with another file version or view. Restated, a version is a different view of the same apparent file where the difference corresponds to a moment in time.

SUMMARY OF THE INVENTION

It is an object of this invention to devise a method to manage the access of data or pages mapped into a very large virtual external address space through a cache without disturbing the logical view of the data and without having to assign physical or real backing store to said logical view.

In the method of this invention, two levels of address indirection are used to avoid both synonym problems and multiple copying of pages common to different logical views (page-organized files) of the pages in cache. As used, pages are referenced according to their address in a linear space as mapped into a virtual external storage address (VESA), and then as mapped into a physical address in external storage. In this regard, the referenced pages are written into cache using their VESA addresses as indexing arguments. That is, the pages are written into a cache and indexed (ordered) by their VESA addresses. Then, multiple views can be formed by binding names (VESA addresses) thereto. This avoids having to duplicate copies of common pages and bind said copies to the views.

Significantly, where cache-stored pages are common to different logical views, they are updated in place; otherwise, they are shadow copied to another cache location using a different VESA. Updating in place of pages (pages) common to different logical views (collections of pages) minimizes use of cache.

In contrast to the aforementioned Woffinden patent, the method of the invention uses an additional layer of indirection (VESA), i.e., pages are indexed in cache by their VESA arguments, avoiding synonym conflict. This requires mapping to external storage via logical to VESA and VESA to real.

Advantageously, the method of this invention (a) generates a unique name for caching and avoids synonymy; (b) uses a unique name for locking; (c) stores data in cache and writes it out only upon change; and (d) if location of a page in real storage changes, then the cache is not invalidated because the logical address remains the same (invariant), and (e) physical backing for the virtual file is not required.

DESCRIPTION OF THE PREFERRED EMBODIMENT

The Host CPU Environment for Executing the Method of the Invention

The invention can be conveniently practiced in a general purpose computer such as an IBM/360 or 370 architected CPU having an IBM MVS operating system. An IBM/360 architected CPU is fully described in Amdahl et al., U.S. Pat. No. 3,400,371, "Data Processing System", issued Sept. 3, 1968.

An MVS operating system is also set out in IBM publication GC28-1150, "MVS/Extended Architecture System Programming Library: System Macros and Facilities", Vol. 1. Details of standard MVS or other operating system services such as lock management, subsystem invocation by interrupt or monitor, and the posting and waiting of tasks is omitted. These operating system services are believed well appreciated by those skilled in the art.

Some Relations Among CPU, Caches, and Storage

For purposes of this invention, a page consists of a fixed number of page bytes, such as 4096. Also, the term "page" is a synonym for "block".

Figure 1:
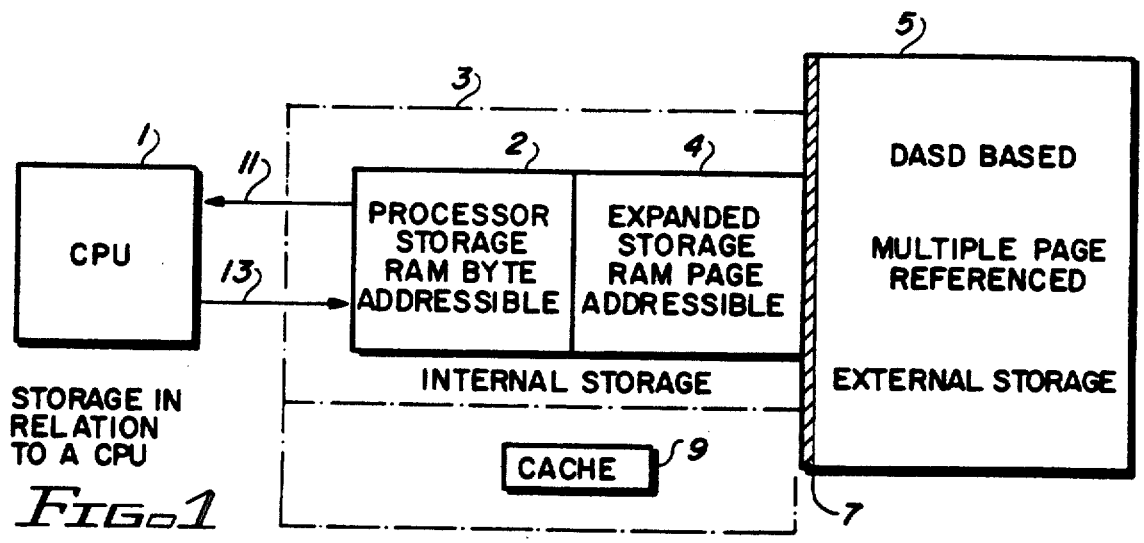
FIG. 1 sets out the organization of storage in relation to a large main frame CPU.

Referring now to FIG. 1, there is shown the relationship of organized storage to the CPU. As depicted, CPU 1 accesses both internal storage 3 and external storage 5 over paths 11 and 13. Internal storage 3 includes processor storage 2, whose contents are byte addressable and randomly accessible, and expanded storage 4, whose contents are page addressable and randomly accessible. External storage 5 comprises one or more DASDs and stores the page of the information referenced by applications executing on CPU 1.

Typically, an application invoking the CPU processor would reference a page by either its virtual/linear or real space address to a cache. In this regard, cache 9 could be hardware or software implemented. If software implemented, the cache could be located anywhere in internal storage 3. If the page is not available in cache 9, then either expanded storage 4 or external storage 5 needs to be accessed.

Where multiple pages are accessed across the I/O boundary 7 in external storage, they may be processed according to methods as set forth in Luiz et al., U.S. Pat. No. 4,207,609, "Path Independent Device Reservation and Reconnection in a Multi-CPU and Shared Device Access System", issued June 10, 1980. Parenthetically, when an access is made to internal storage, the processor waits until the access is completed. When access is made across the I/O boundary, the processor invokes another task or process while awaiting fetch (access) completion.

Address Translation and Cache Placement

Figure 2:
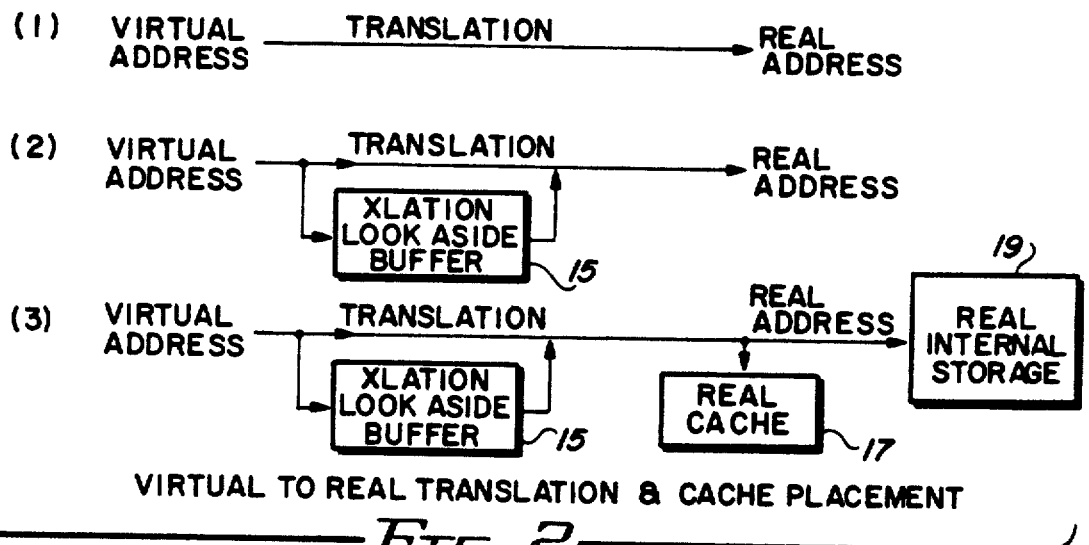
FIG. 2 conceptually depicts virtual-to-real address translation, associative memory assist, and cache placement according to the prior art.

Referring now to FIG. 2, there is conceptually depicted virtual-to-real address translation, associative memory assist, and cache placement according to the prior art.

As shown in FIG. 2, row (1), the conversion of a virtual address to a real address is usually implemented in hardware or fast microcode and involves an address translation or mapping. That is, in a typical IBM System/370 machine, the address translation mechanism will decompose a virtual address into a page address and a relative page displacement.

As previously mentioned in connection with the discussion on demand paging, internal storage set aside in support of paging is organized into fixed pages called page frames. A page table may be used to correlate a virtual address reference in a program and the real address of a page frame in internal storage. The effective page address can be ascertained by adding the relative address to the page frame location. A further discussion may be found in Lorin and Deitel, "Operating Systems", The Systems Programming Series, copyright 1981 by Addison-Wesley Publishing Co., chapter 14 describing virtual storage, pp. 293-314.

Referring now to FIG. 2, row (2), there is shown one prior art technique for expediting the virtual-to-real address translation through the use of a "translation lookaside buffer" (TLB). The TLB 15 is formed from random access memory and is operative as an LRU associative memory in which the address of data being accessed is performed in parallel with the instruction being decoded by the CPU.

If a real cache 17 is placed ahead of real CPU main memory 19, as shown for instance in FIG. 2, row (3), then it has the advantage of storing pages with different virtual addresses and pages located in different virtual address spaces. However, it suffers the disadvantage that cache accessing occurs only after the virtual-to-real translation has been performed. In a real cache, address translation is first performed followed by a table lookup.

Figure 3:
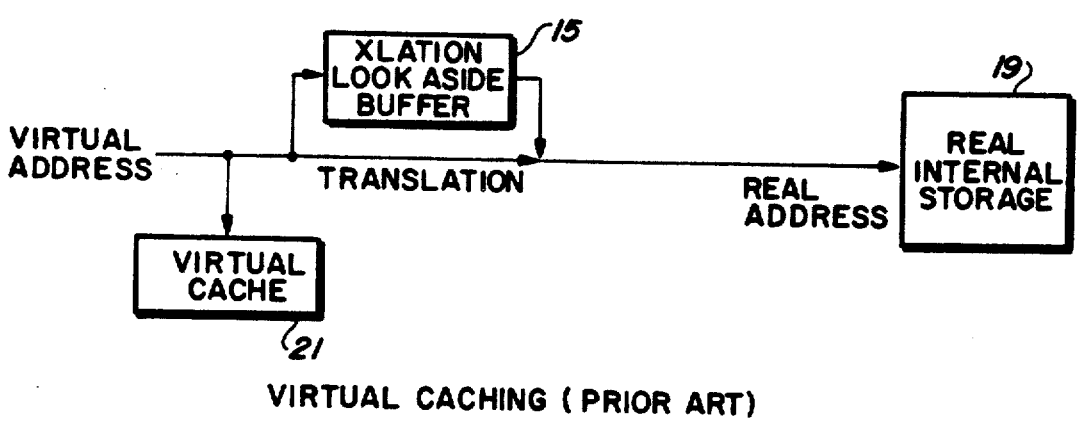
FIG. 3 shows a concept to virtual caching according to the prior art.

Referring now to FIG. 3, there is shown the placement of a virtual cache 21 prior to the address translation and real internal storage 19. This organization is patterned upon the hardware cache embodiment found in the above-mentioned Woffinden patent. As pointed out in Woffinden, col. 2, lines 43-49:

"The buffer typically contains a small fraction of the main store data at any time. In the virtually addressed buffer, the location of the data is not a function of main store real addresses, but is a function of the virtual addresses. Therefore, main store addresses do not map to unique buffer addresses. More than one real address can be translated to the same virtual address location in the buffer."

Woffinden's solution to the problem of synonymy is breifly described at col. 2, line 62, through col. 3, line 2, of the patent:

"Since different virtual addresses may specify the same data location that corresponds to a single real address location in main-store, it is possible that the virtual-address buffer will store more than one copy, called a synonym, of the same data at different locations. For this reason, a real-to-virtual translator translates main store real addresses to all buffer virtual addresses to locate buffer resident synonyms when modified data is stored into the buffer."

Cache Placement According to the Invention

In the method of this invention, the cache is software created and managed portion of internal storage. It serves as an external storage cache. In this regard, such a software cache is operatively different from the CPU cache hardware arrangement described in the Woffinden patent. In Woffinden's CPU cache, address resolution and access are in terms of microseconds, whereas resolution and access in the software external storage cache are in terms of milliseconds. This permits additional or refined processing.

Figure 4:
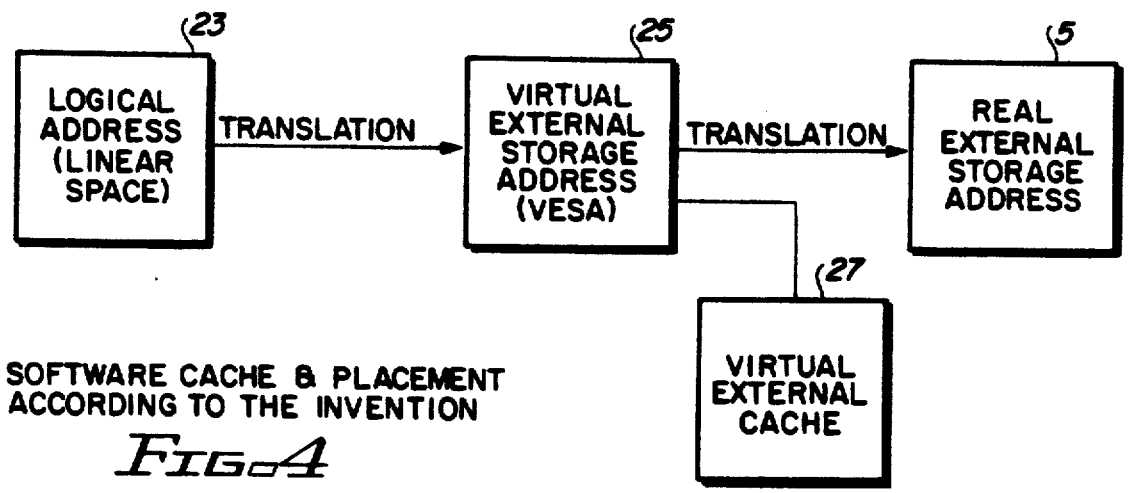
FIG. 4 depicts software caching and its placement according to the invention.

Referring now to FIG. 4, there is depicted software caching and its placement according to the invention. Two address translations or levels of indirection are shown. The first is the virtual or logical address 23 mapped into a virtual external storage address space (VESA) 25, while the second is VESA mapped into the real external storage address space 5. Access to the cache 27 is only by way of a VESA argument. Cache 27 is positioned subsequent to the first mapping and prior to the second.

Avoidance of Synonymy Using VESA Ordered Pairs

The use of two levels of indirection in the method of this invention takes advantage of the nature of base plus displacement addressing as described in connection with demand paging and virtual addressing. In this regard, suppose an application executing on CPU 1 specifies the 100th relative page. If there are multiple versions of that page, then each version has the same logical address. These are different versions of the sam file.

In this invention, the mapping from the name space to the intermediary space is many to one. Thus, two linear spaces sharing the same page would map to one single virtual external storage address (VESA) without synonym problems. The use of intermediate external storage avoids the synonym problem.

Figure 5:
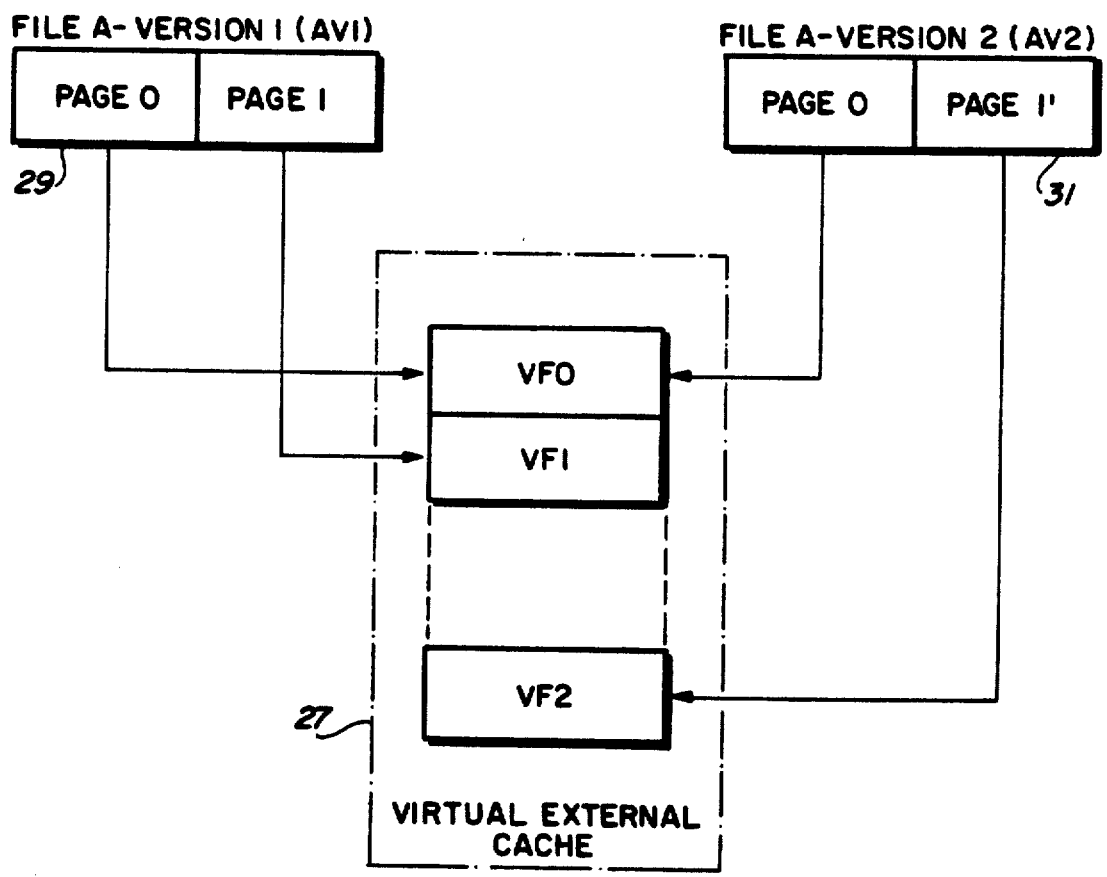
FIG. 5 sets forth the manner by which the synonym problem is avoided using the VESA-ordered pages in a cache according to the invention.

Referring now to FIG. 5, there are set out two versions of the same file and the virtual external cache 27. Illustratively, the first file 29 bears the logical name File A Version 1 (AV1). It comprises original pages 0 and 1. The second file 31 bears the logical name File A Version 2 (AV2). AV2 includes original page 0 and modified page 1 (page 1'). The pages 0, 1, and 1' are mapped into the VESA addresses (so-called virtual frames) VF0, VF1, and VF2, respectively. Only one copy of page 0 need be stored in cache 27.

Updating in Place and Shadow Copying

The method of the invention provides that responsive to a write in place of a page common to the original and updated files, the common pages are updated in place. This renders updated values available to both files (views). If the page to be written or updated is not common, then a shadow copy is written thereof in cache assigning yet another logical external storage space thereto.

Figure 6:
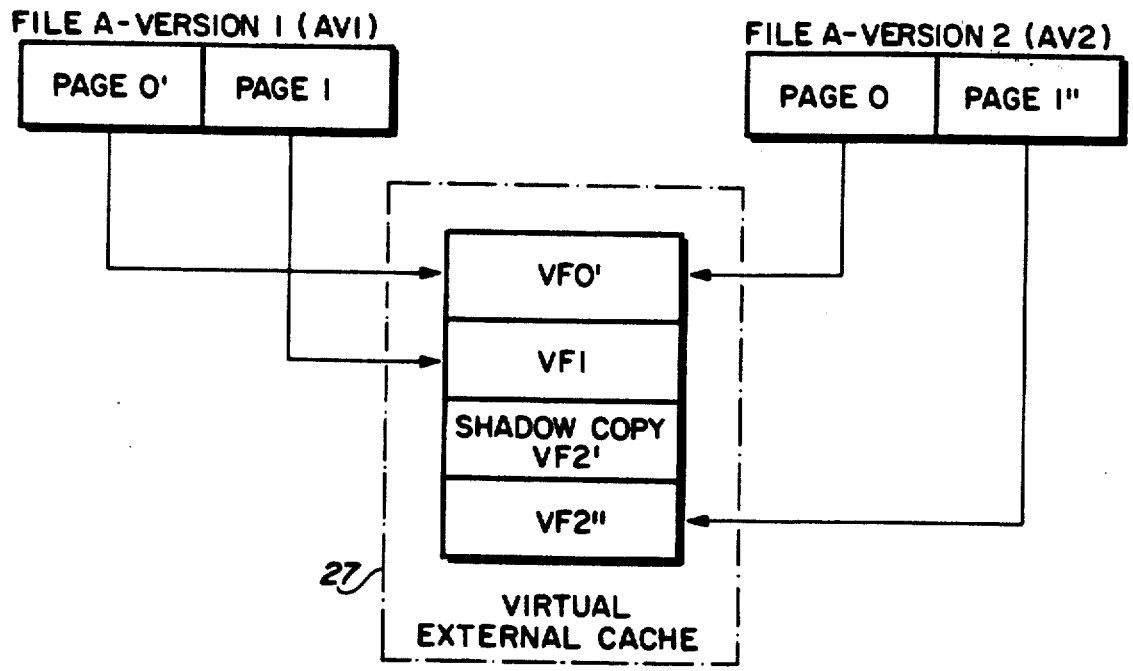
FIG. 6 illustrates updates in place and shadow copying.

Referring now to FIG. 6, there are shown changed files AV1 and AV2 and a different storage mix in cache 27. More particularly, assume that AV1 includes an original page 0 and an original page 1. Also, assume that AV2 consists of an original page 0 and a modified page 1'. The manager for cache 27 assigns VESA address VF0 to page 0, VF1 to page 1, and VF2' to page 1'. In the event an application updates page 0, then an update in place at VF0 will occur because page 0 is common to AV1 and AV2. However, an update to page 1' will be processed by way of writing the changed page 1" to a VESA address in the cache at VF2" and leaving the old page 1' as the shadow at cache VESA address VF2'.

Algorithmic Expression of the Method Using Another Example

Figure 7:
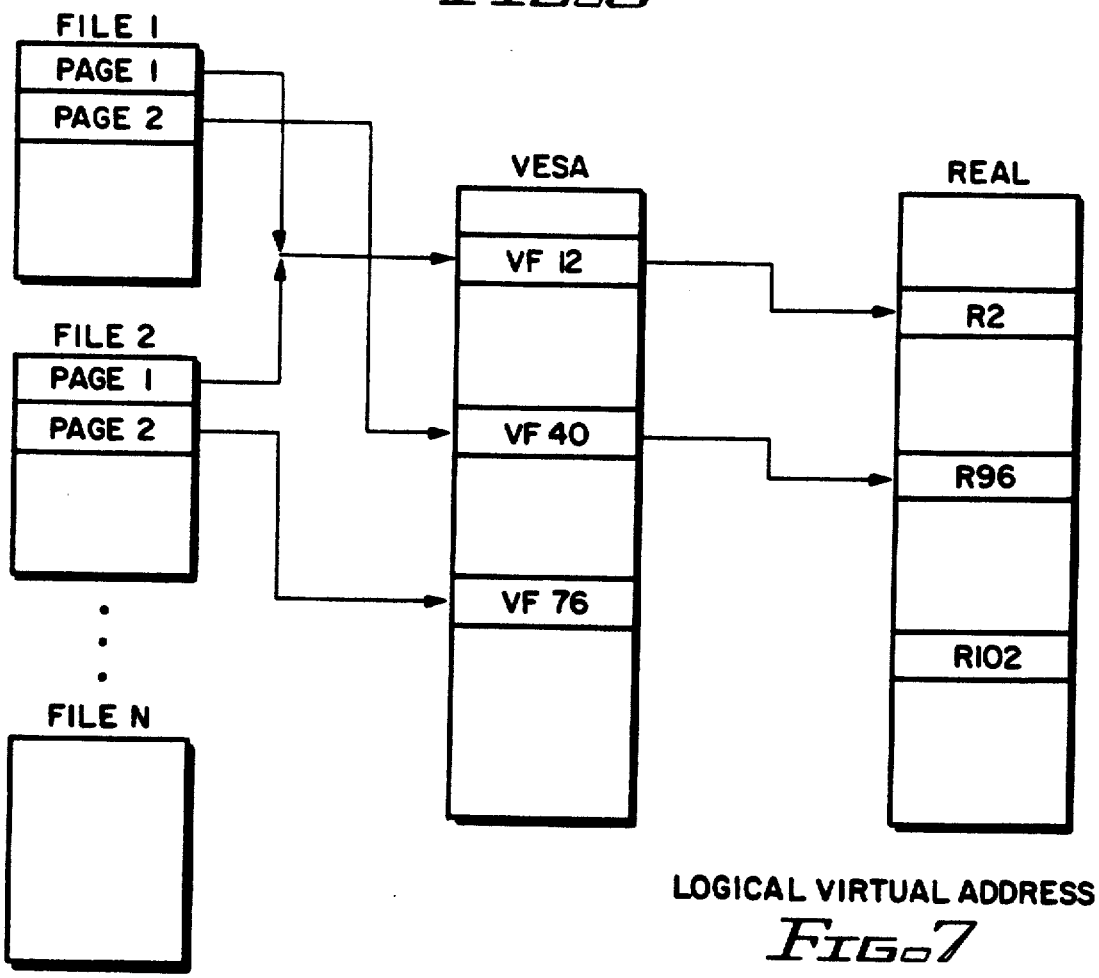
FIG. 7 is another mapping example involving several different views according to the invention.

Referring now to FIG. 7, there is shown the double mapping of pages from files 1 and 2 to VESA-ordered cache to real internal or external storage. Consider the following:

Suppose the initial state of the system consisted of file 1 formed from pages 1 and 2. Also, pages 1 and 2 are mapped into VESA addresses VF12 and VF40, and then mapped into real addresses R2 and R96. Next, assume that file 2 was created initially as an image of file 1. The first concordance for pages 1 and 2 includes VF12 and VF40. The second concordance includes R2 and R96.

In order for page 2 of file 2 to become updated without sharing it with file 1, it is necessary to first allocate a new VESA, i.e., VF76 in cache 27. The concordance or page map for file 2 is then altered. After this, updated page 2' is written to cache location VF76. Real storage in the form of a DASD location, i.e., R102, is allocated and page 2' is copied therein. Parenthetically, VF40 remains the shadow location to VF76.

If page 1 is rewritten, then no new allocation in cache 27 is needed because the page is shared between the files. The existing mapping to VF12 remains the same and the updated page 1' is written therein. Likewise, the contents of VF12 are copied to DASD real location R2.

If the changes to cache 27 can be batched to the point where the cache is filled, then the transfer to DASD real storage can be at one time. This yields a transfer efficiency when compared to multiple discrete backing store updates.

If file 1 is deleted before it is written (e.g., if it is a temporary file), then none of its constituent virtual frames are ever allocated in real storage. Allocation to real storage is only required when frames are actually written: their existence in the cache does not require this.

This and other extensions of the invention may be made without departing from the spirit and scope thereof as recited in the appended claims.

We claim:

1. A CPU implemented method for managing a cache for external storage having a first and second page organized files including a data file versioning feature, said CPU including internal storage formed from RAM addressable pages and external storage formed from DASD addressable pages, comprising the steps of:
   (a) creating at least two named pages (FIG. 5 PAGE 0, PAGE 1) in a predetermined file (FIG. 5 AV1) and assigning device independent locations in a logical external storage space (VF0, VF1);
   (b) writing the pages (PAGE 0, PAGE 1) into a cache and indexing the cache location of said pages by the logical external storage space address (VF0, VF1);
   (c) responsive to an update of a page (FIG. 5 PAGE 1') not common to said first (AV1) and second (AV2) files, assigning another logical external storage space (VF2 for PAGE 1') and storing the updated pages in cache in said another storage space location; and
   (d) responsive to an update of a page common (PAGE 0) to the first (AV1) and second (AV2) files, updating the page in place in the cache (FIG. 6 VF0'), otherwise responsive to an update of a page not in common (PAGE 1"), writing the update in cache at yet another logical external storage space (FIG. 6 VF2") and retaining the original page at its former cache location (FIG. 6 VF2').

2. The method according to claim 1, wherein said method includes the further steps as pertains to a nonvolatile cache of:
   (e) responsive to a full cache, allocating space on external storage, copying updated pages to that space, and forming a concordance between the logical external space location and the physical location in external storage.

3. The method according to claim 1, wherein the cache is a non-volatile cache selected from a set consisting of addressable memory formed from bistable remanant magnetic material or bistable battery back electrostatic material.

4. In a demand paging storage system of the type in which a CPU accesses each page according to its address in a linear, virtual address space from a RAM page organized cache, and further in which an accessed page not available in cache is staged from a location in an external backing store to said cache, each CPU page access to said cache including a virtual to real address translation, wherein a CPU implemented method for accessing pages in said cache without disturbing logical views of said pages and without having to assign additional backing store thereto, said logical views being expressed as a counterpart first and second page-organized file, comprises the steps of:
   (a) translating each CPU page access from the linear virtual page address to an address in a second linear virtual address space representing cache locations, translating the address in the second linear virtual address space into a real address in the external backing store, and writing the page into the cache at its address in the second linear virtual address space from the backing store unless the page has already been written into the cache; and
   (b) responsive to each access from the CPU seeking to update a page stored in cache by writing the updated page in its second linear virtual address space cache location if the page is common to the first and second page organized files, otherwise, writing the updated page to another cache location having another second linear virtual address space address.

5. The method according to claim 4, wherein the method further includes the step of (c) writing the pages out from the cache to real addresses in the external backing store only upon update to the cache stored page.

6. The method according to claim 4, wherein the method further includes the step of (d) omitting the invalidation of the page in the cache as long as its second linear virtual address remains the unchanged.

* * * * *